United States Patent [19]

Horie

[11] 3,944,856
[45] Mar. 16, 1976

[54] CHOPPER CONTROL SYSTEM
[75] Inventor: Taturo Horie, Katsuta, Japan
[73] Assignee: Hitachi, Ltd., Japan
[22] Filed: Nov. 11, 1974
[21] Appl. No.: 522,922

[52] U.S. Cl............. 307/240; 307/252 M; 307/269; 318/138; 318/341; 321/45 C
[51] Int. Cl.²................... H03K 17/72; H02M 7/48
[58] Field of Search....... 302/240, 252 M, 269, 271; 318/341, 345, 138; 321/43, 45 C; 328/62, 63

[56] References Cited
UNITED STATES PATENTS
3,747,000   7/1973   Melver............................ 307/240 X Primary Examiner—John Zazworsky
Attorney, Agent, or Firm—Craig & Antonelli

[57] ABSTRACT

A system for controlling a thyristor chopper used for the speed control of a d.c. motor driving an electric car, in which means are provided for generating turn-on pulses and turn-off pulses at the maximum chopping frequency of the chopper, dividing the frequency of the turn-on pulses and turn-off pulses stepwise in response to the application of chopping frequency instruction signals, and applying these frequency-divided turn-on and turn-off pulses to the chopper for controlling the chopper, so that the motor can be smoothly controlled by the chopper whose chopping frequency varies stepwise from a low to a high valve with conductive rate-control.

5 Claims, 10 Drawing Figures

CHOPPER CONTROL SYSTEM

This invention relates to a chopper control system and more particularly to a system for controlling a thyristor chopper used for the speed control of a d.c. motor which drives an electric car.

Prior art and the present invention and the advantages of the latter will be described in detail with reference to the accompanying drawings, in which.

A d.c. motor is commonly used for driving an electric car in view of the ability of a d.c. motor to produce desired starting torque. Hitherto, the combination of a resistor and a contactor disconnectably connecting the resistor to the motor circuit has been generally employed for controlling the torque and speed of a d.c. motor used for driving an electric car. However, this method of torque and speed control has been defective in that the torque and speed of the d.c. motor cannot be continuously controlled and a great power loss is inevitable.

With a view to obviate such defect, it has been proposed to control such d.c. motor by a thyristor chopper, and this method has already been put into practical use. The control of the d.c. motor of an electric car by the thyristor chopper is advantageous in that the motor can be smoothly and continuously controlled over the entire speed range, and therefore, the electric car driven by the motor controlled by the thyristor chopper provides a very comfortable sense of ride for passengers. Further, the motor control by the thyristor chopper is advantageous in reducing the power loss and improving the efficiency.

Figure 1:
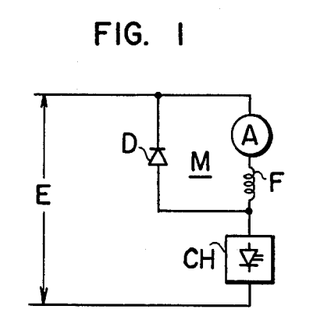
FIG. 1 is a circuit diagram of a traction motor circuit of an electric car controlled by a chopper in the powering condition.

FIG. 1 is a circuit diagram of a traction motor circuit of an electric car controlled by a chopper in the powering condition. In FIG. 1, the symbols E, M, A, F, CH and D designate a power supply voltage, a traction motor, an armature of the traction motor M, a series field winding of the traction motor M, a chopper, and a free wheel diode respectively.

Figure 2:
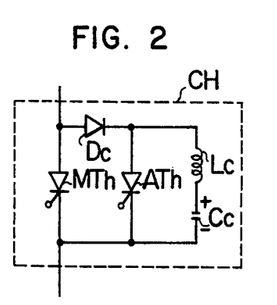
FIG. 2 is a circuit diagram showing the structure of one form of the chopper in FIG. 1.

The structure of one form of the chopper CH is shown in FIG. 2. The chopper CH comprises a main thyristor MTh, a commutating thyristor ATh, a commutating reactor Lc, a commutating capacitor Cc and a commutating diode Dc. The commutating capacitor Cc is charged in the illustrated polarity in the non-conducting state of the chopper CH.

Figure 3:
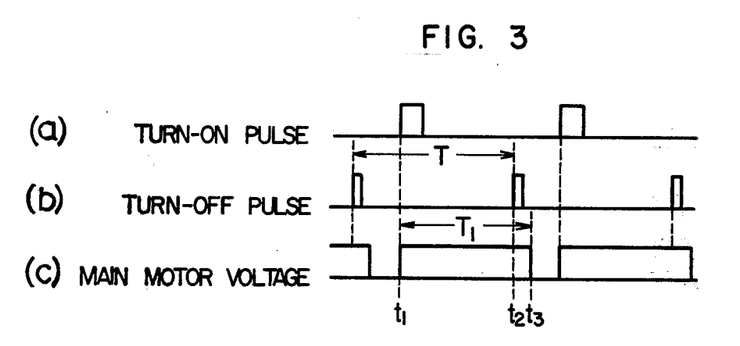
FIG. 3 shows pulse and voltage waveforms applied to the chopper and motor in FIGS. 1 and 2.

FIG. 3 shows pulse and voltage waveforms applied to the thyristors of the chopper CH and motor M to illustrate the basic operation of the chopper CH. A gate firing signal (a turn-on pulse) as shown in FIG. 3a is applied to the gate of the main thyristor MTh at time $t_1$. As a result, the main thyristor MTh, hence the chopper CH conducts, and the power supply voltage E is applied across the traction motor M. At time $t_2$, another gate firing signal (a turn-off pulse) as shown in FIG. 3b is applied to the gate of the commutating thyristor ATh. As a result, commutation occurs and current flows through the closed loop of Cc - Lc - ATh - Cc, and the commutating capacitor Cc is charged in a polarity opposite to the illustrated polarity. Thus, the motor current flows through the chopper CH until both the main thyristor MTh and the commutating thyristor ATh are rendered non-conducting at time $t_3$ which is later than the time $t_2$ by a period of time including that required for commutation. That is, the chopper CH is rendered non-conducting at this time $t_3$. When the chopper CH is rendered nonconducting, the power supply voltage $E$ is not applied to the traction motor M, and the current having been supplied to the traction motor M circulates now through the free wheel diode D. FIG. 3c shows the voltage applied across the traction motor M. The mean value $E_M$ of the applied voltage is given by $$E_M = E \times \frac{T_1}{T} - I_M \cdot R_M$$

where $T$ is the period of time of one operating cycle of the chopper CH, $T_1$ is the conducting period of time of the chopper CH, $I_M$ is the traction motor current, and $R_M$ is the internal resistance of the traction motor M.

It can thus be seen that the mean voltage $E_M$ applied across the traction motor M can be controlled substantially within the range of from zero to the full power supply voltage E by controlling the ratio between the conducting period of time $T_1$ of the chopper CH and the period of time of one operating cycle $T$ of the chopper CH. This ratio $T_1/T$ will be hereinafter referred to as a duty factor.

It will be understood from the above description that the traction motor M is controlled by the chopper CH in such a manner that turn-on and turn-off pulses are alternately applied to the thyristors of chopper CH for electrically turning on and off the chopper CH thereby varying the mean voltage applied across the traction motor M.

Two methods are known for starting the main motor by the chopper which is controlled in the manner above described. In one of the methods, the chopper operates at a fixed frequency for starting the motor. According to this method, however, a large starting current flows due to the small resistance value of the motor circuit and gives rise to a shock in the starting stage, and the electric car driven by the motor subject to this kind of chopper control provides an uncomfortable sense of ride for passengers. A starting resistor is commonly connected in series with the motor circuit to restrict the starting current in order to alleviate the shock. In spite of the provision of the starting resistor, this method is still defective in that smooth starting cannot be attained and troublesome manipulation is required.

In the other method, the operating frequency of the chopper is varied continuously from a low to a high frequency in starting the traction motor. This method comprises supplying current to the traction motor through the commutating thyristor, applying turn-off pulses only without applying turn-on pulses, and varying the frequency of the turn-off pulses for regulating the current value supplied to the traction motor. This latter method will be described in more detail with reference to FIGS. 4 and 5.

Figure 4:
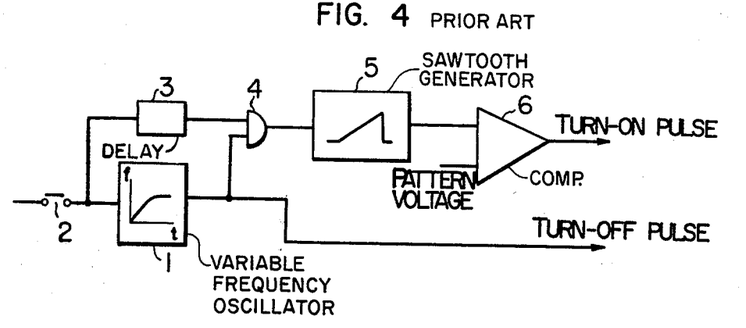
FIG. 4 is a block diagram of a prior art chopper control system.

FIG. 4 shows a prior art chopper control system used for controlling the chopper shown in FIG. 2.

According to this prior art chopper control system, turn-off pulses are solely applied to the chopper CH in the starting stage of the traction motor M, and the operating frequency of the chopper CH is varied continuously from a low to a high frequency. After starting, the operating frequency of the chopper CH is maintained constant, and turn-on and turn-off pulses are alternately applied to control the chopper CH for controlling the speed of the traction motor M.

Referring to FIG. 4, a variable frequency oscillator 1 provided with a limiter determines the operating frequency of the chopper CH. The variable frequency oscillator 1 generates pulses in response to the application of a starting signal thereto via a contactor 2. The frequency increases from a low value to a relatively high predetermined value in a predetermined period of time, and after then, pulses at the predetermined frequency are generated. The pulses generated by the variable frequency oscillator 1 are applied to the chopper CH in FIG. 2 as the turn-off pulses. The pulses generated within the predetermined period of time above described are applied to the commutating thyristor ATh in the starting stage of the traction motor M so as to regulate the traction motor current. A delay unit 3 acts to open an AND gate 4 in a predetermined period of time after the application of the starting signal. A saw-tooth waveform generator 5 is reset each time an input pulse is applied thereto in synchronism with the frequency of the turn-off pulses generated by the variable frequency oscillator 1. A compactor 6 generates a pulse output when the voltage level of the saw-tooth waveform attains the level of a pattern voltage which sets the voltage applied across the traction motor M. The output of the comparator 6 provides the turn-on pulses applied to the main thyristor of the chopper CH. Therefore, the turn-on pulses do not appear in the starting stage of the traction motor M by the action of the delay unit 3 and appear after the traction motor M has been started. After the traction motor M has been started, the turn-off and turn-on pulses are alternately applied for controlling the chopper CH.

Figure 5:
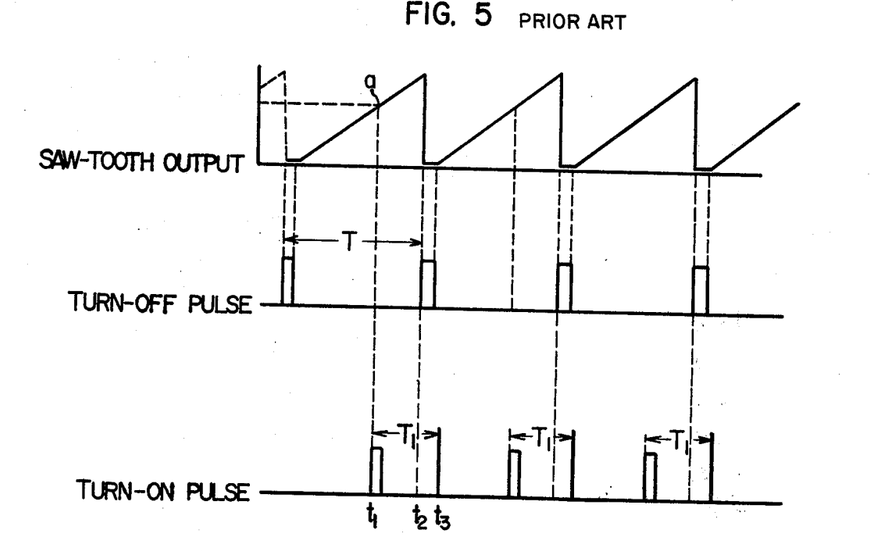
FIG. 5 shows voltage and pulse waveforms appearing at various parts of the control system in FIG. 4.

FIG. 5 shows voltage and pulse waveforms appearing in the system of FIG. 4 after the main motor M has been started. The turn-off pulses shown in FIG. 5 are obtained from the variable frequency oscillator 1 as described. The turn-on pulses shown in FIG. 5 are obtained from the comparator 6 which delivers an output when the saw-tooth waveform voltage level attains the level of the pattern voltage as described. In FIG. 5, this level is represented by $a$. These turn-on and turn-off pulses are applied respectively to the main and commutating thyristors MTh and ATh in the chopper CH shown in FIG. 2.

According to the structure of the chopper control system shown in FIG. 4, the frequency of the turn-off pulses is varied continuously from a low to a high value for controlling the chopper in the starting stage of the traction motor. Although the traction motor can be started with restricted starting current and reduced shock by the chopper control system shown in FIG. 4, this system is still defective in that a wide frequency band is required tending to produce a noise which affects communication and signal equipment.

Further, the prior art methods above described have a common defect as pointed out below. According to the prior art methods, a constant period of time which is independent of the frequency is required to turn-off the chopper due to the fact that the chopper is operated at the maximum chopping frequency after the traction motor has been started. Thus, the duty factor cannot be increased beyond the value determined by the maximum chopping frequency, resulting in the defect that the mean voltage applied across the traction motor is reduced and the utilization factor of the power supply voltage is insufficient. Further, the fact that the chopper operates continuously at the maximum chopping frequency provides another defect that the commutating capacitor must have a large capacity.

With a view to obviate such prior art defects, it is an object of the present invention to provide a novel and improved chopper control system which can easily eliminate wide interference to the communication system and ensures smooth starting of a traction motor.

Another object of the present invention is to provide a chopper control system which can improve the utilization factor of a power supply voltage.

Still another object of the present invention is to provide a chopper control system in which the capacity of a commutating capacitor can be reduced.

Other objects of the present invention will become apparent from the following detailed description.

The present invention is featured by the fact that turn-on pulses and turn-off pulses at the maximum chopping frequency $f$ of a chopper are initially generated and then the frequency of the turn-on pulses and/or turn-off pulses is divided into a plurality of stepwise varying frequencies $f/1, f/2, f/3, \ldots$ in response to the application of chopping frequency instruction signals so as to attain smooth control of a traction motor by the chopper whose chopping frequency varies in stepped fashion from a low to a high frequency value.

Figure 6:
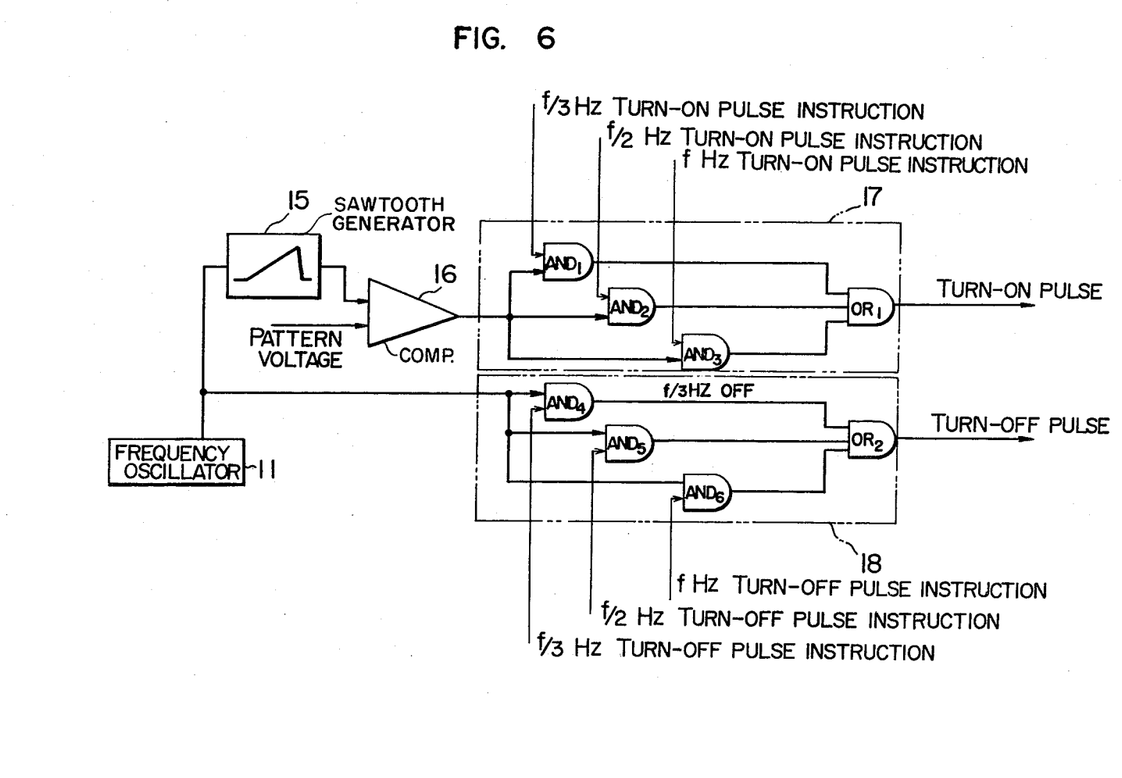
FIG. 6 is a block diagram of an embodiment of the chopper control system according to the present invention.

FIG. 6 shows an embodiment of the chopper control system of the present invention when applied to control the chopper CH shown in FIG. 2. In FIG. 6, the maximum chopping frequency $f$ is divided in stepped fashion into $f/1, f/2$ and $f/3$ by way of example. Referring to FIG. 6, a frequency oscillator 11 generates pulses having a frequency of $f$ Hz which determine the maximum chopping frequency of the chopper CH. A saw-tooth waveform generator 15 and a comparator 16 in FIG. 6 may be similar to the saw-tooth waveform generator 5 and comparator 6 shown in FIG. 4. In the embodiment shown in FIG. 6, a group of AND gates $AND_1$ to $AND_3$ and an OR gate $OR_1$ constitute a turn-on pulse selector 17, and another group of AND gates $AND_4$ to $AND_6$ and another OR gate $OR_2$ constitute a turn-off pulse selector 18.

A saw-tooth waveform voltage is generated by the saw-tooth waveform generator 15 in synchronism with the turn-off pulses of the frequency of $f$ Hz generated by the frequency oscillator 11, and this saw-tooth waveform voltage is applied to the comparator 16. The comparator 16 compares this saw-tooth waveform voltage with a pattern voltage and generates turn-on pulses having a frequency of $f$ Hz. The turn-on pulses having the frequency of f Hz are applied to the AND gates $AND_1$ to $AND_3$. $f/3$ Hz, $f/2$ Hz and $f$ Hz turn-on pulse instruction signals, which instruct that turn-on pulses of $f/3$ Hz, $f/2$ Hz and $f$ Hz are to be applied to the main thyristor MTh (FIG. 2), respectively, are applied as another input to these AND gates $AND_1$ to $AND_3$ respectively. The turn-on pulses pass through the specific AND gate to which the turn-on pulse instruction signal is applied, and these pulses pass then through the OR gate $OR_1$ to be applied to the main thyristor MTh in FIG. 2. When, for example, the $f/3$ Hz turn-on pulse instruction signal appears, the frequency $f$ Hz of the turn-on pulse output of the comparator 16 is divided into $f/3$ Hz at the AND gate $AND_1$, and the turn-on pulses having the frequency of $f/3$ Hz are applied through the OR gate $OR_1$ to the main thyristor MTh. Similarly, the turn-off pulses of the frequency of $f$ Hz generated by the frequency oscillator 11 are applied to the AND gates $AND_4$ to $AND_6$. $f/3$ Hz, $f/2$ Hz and $f$ Hz turn-off pulse instruction signals, which instruct that turn-off pulses of $f/3$ Hz, $f/2$ Hz and $f$ Hz are to be applied to the commutating thyristor ATh (FIG. 2), respectively, are applied as another input to these AND gates $AND_4$ to $AND_6$, respectively. The turn-off pulses pass through the specific AND gate to which the turn-off pulse instruction signal is applied, and these pulses pass then through the OR gate $OR_2$ to be applied to the commutating thyristor ATh in FIG. 2.

These instruction signals may be applied in synchronism with the saw-tooth waveform voltage.

Figure 7:
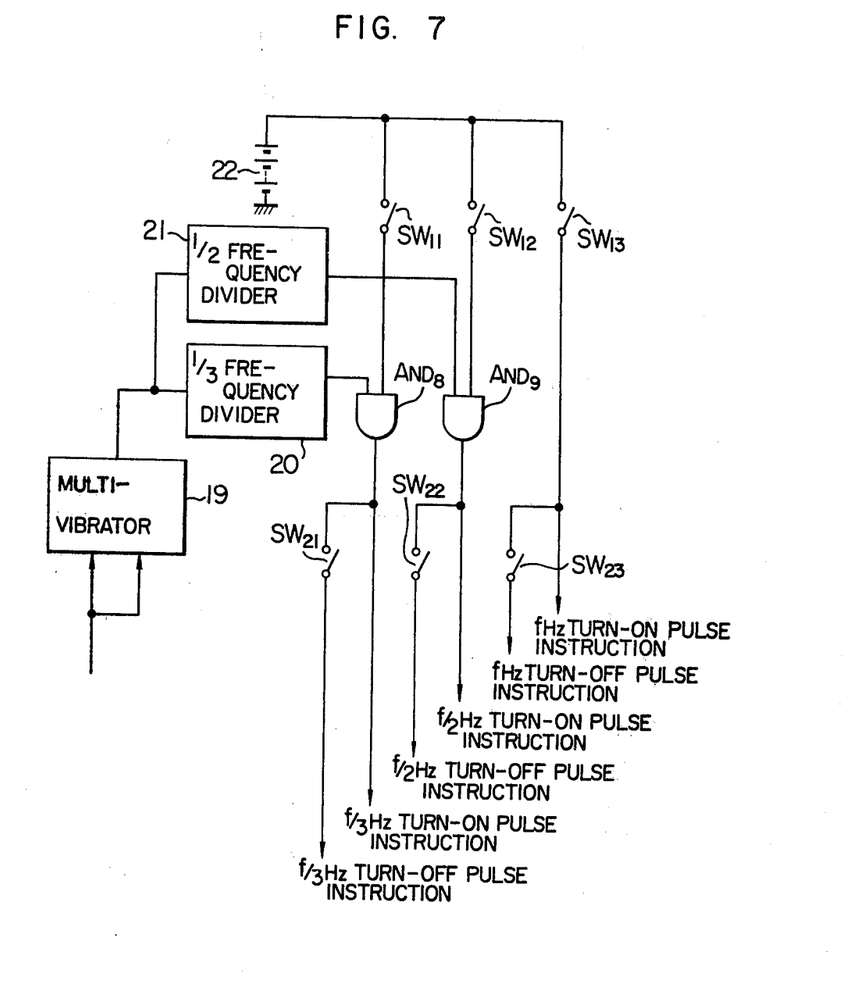
FIG. 7 is a circuit diagram of means employed in the present invention for generating instruction signals for selecting the frequency of turn-off and turn-on pulses used for the control of the chopper shown in FIG. 2.

An explanation will be made of generation of the turn-on pulse instruction signals and the turn-off pulse instruction signals with reference to FIGS. 7 and 8. FIG. 7 shows a circuit arrangement for producing the instruction signals, and FIG. 8 shows waveforms of signals at main portions of the circuit.

Figure 8:
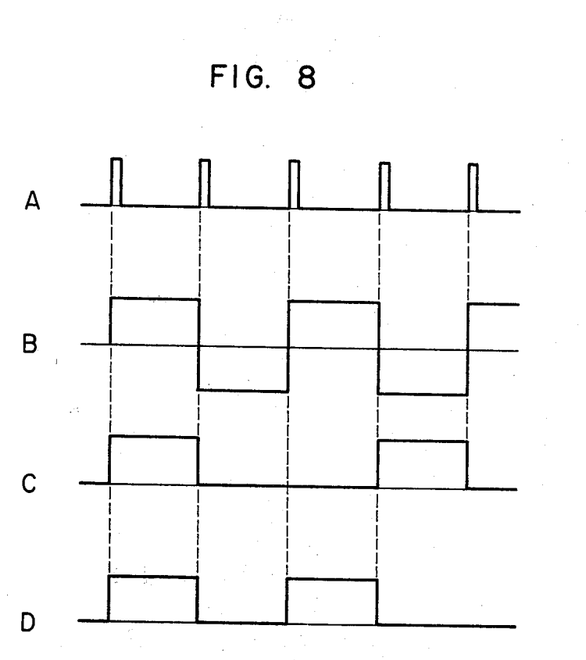
FIG. 8 shows pulse waveforms appearing at various parts of the circuit shown in FIG. 7.

The pulses having a frequency of $f$ Hz such as shown in FIG. 8A, which is generated from the frequency oscillator 11 (FIG. 6), is fed to a multi-vibrator 19 and converted to pulses having a width of 180° as shown in FIG. 8B. A ⅓ frequency divider 20 and a ½ frequency divider 21 receive the output pulses of the multi-vibrator 19 and produce pulses having a frequency of $f/3$ Hz such as shown in FIG. 8C and pulses having a frequency of $f/2$ Hz such as shown in FIG. 8D, respectively. In this circuit, when switches $SW_{11}$ and $SW_{21}$ are closed, the pulses shown in FIG. 8C are given to the AND gates $AND_1$ aand $AND_4$ in FIG. 6 as the $f/3$ Hz turn-on pulse instruction signal and the $f/3$ Hz turn-off pulse instruction signal, respectively. When switches $SW_{12}$ and $SW_{22}$ are closed with opening the switch $SW_{11}$, the pulses shown in FIG. 8D are given to the AND gates $AND_2$ and $AND_5$ in FIG. 6 as the $f/2$ Hz turn-on pulse instruction signal and the $f/2$ Hz turn-off pulse instruction signal, respectively. The $f$ Hz turn-on pulse instruction signal and the $f$ Hz turn-off pulse instruction signal are obtained by means of power supply 22. Namely, when a switch $SW_{13}$ is closed, a d.c. voltage of the power supply 22 is derived as the $f$ Hz turn-on pulse instruction signal and, when a switch $SW_{23}$ is closed in addition to the close of the switch $SW_{13}$, the d.c. voltage of the power supply 22 is derived as the $f$ Hz turn-off pulse instruction signal. They are fed to the AND gates $AND_3$ and $AND_6$ in FIG. 6, respectively. The switch $SW_{12}$ is not necessarily opened when the switch $SW_{13}$ is closed, since giving of the $f$ Hz turn-on pulse instruction signal and the $f$ Hz turn-off pulse instruction signal means that all of the turn-on pulses produced by the comparator 16 in FIG. 6 and all of the turn-off pulses produced by the frequency oscillator 11 are to be fed to the thyristors MTh and ATh of the chopper CH (FIG. 2).

In the free running operation of the traction motor, the frequency of the turn-off pulses is reduced to $f/2$ Hz and then $f/3$ Hz under production of the turn-on pulses of $f$ Hz. A description will be made of application of the turn-on pulse instruction signals and the turn-off pulse instruction signals to the AND gates $AND_1$ to $AND_6$ in such free-running operation. First, the switches $SW_{11}$ and $SW_{12}$ are closed after the switch $SW_{13}$ is closed. When the switch $SW_{23}$ is then opened and the switch $SW_{22}$ is closed, the $f$ Hz turn-on pulse instruction signal remains to be delivered, but the $f$ Hz turn-off pulse instruction signal is not delivered but the $f/2$ Hz turn-off pulse instruction signal is derived through the switch $SW_{22}$, which is fed to the AND gate $AND_5$. Accordingly, the $f/2$ Hz turn-off pulses are applied to the thyristor ATh of the chopper CH. In this case, the $f/2$ Hz turn-on pulse instruction signal is applied to the AND gate $AND_2$ in addition to application of $f$ Hz turn-on pulse instruction signal to the AND gate $AND_3$. However, this does not cause a problem since the application of the $f$ Hz turn-on pulse instruction signal to the AND gate $AND_3$ means that all of the turn-on pulses produced by the comparator 16 are to be fed to the thyristor MTh of the chopper CH. Then, when the switch $SW_{22}$ is opened and the switch $SW_{21}$ is closed, the $f/3$ Hz turn-off pulse instruction signal is delivered to the AND gate $AND_4$ through the switch $SW_{21}$, and therefore the $f/3$ Hz turn-off pulses are fed to the thyristor ATh of the chopper CH. In this case, the $f/3$ Hz turn-on pulse instruction signal is produced in addition to the $f$ Hz turn-on pulse instruction signal and the $f/2$ Hz turn-on pulse instruction signal. However, this also does not cause a problem for the above reason.

Figure 9:
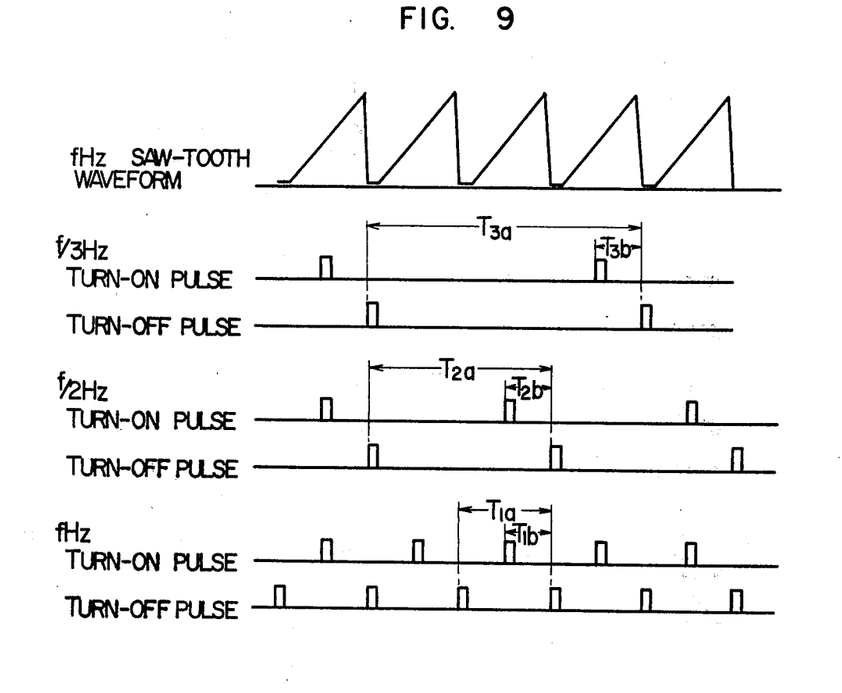
FIG. 9 shows the relation between the turn-off and turn-on pulses generated by the system of FIG. 6 in the accelerating condition.

FIG. 9 shows the relation between the turn-on and turn-off pulses with respect to the corresponding instruction signals. It will be seen from FIG. 9 that, when the $f/3$ Hz turn-on pulse instruction signal and the $f/3$ Hz turn-off pulse instruction signal are applied to the AND gates $AND_1$ and $AND_4$, respectively, the chopper operates with a chopping frequency of $f/3$ Hz and the duty factor is about one-third of that of the case in which the chopping frequency is $f$ Hz when the pattern voltage is constant, and maximum duty factor is also about one-third of that of such case. Similarly, when the $f/2$ Hz turn-on pulse instruction signal and the $f/2$ Hz turn-off pulse instruction signal are applied to the AND gates $AND_2$ and $AND_5$, respectively, the chopper operates with a chopping frequency of $f/2$ Hz and the duty factor is about one-half of that of the case in which the chopping frequency is f Hz when the pattern voltage is constant, and maximum duty factor is also about one-half of that of such case. It is needless to say that the duty factor of the chopper is suitably adjusted when the chopping frequency is varied. It is to be noted that the period of time required for commutation is not taken into account in FIG. 9.

The operation of the system in the starting stage of the traction motor will be described. In the starting stage of the traction motor, the chopper operates with a chopping frequency of $f/3$ Hz. This is attained by applying the corresponding turn-on pulse and turn-off pulse instruction signals in pulse form to the respective AND gates $AND_1$ and $AND_4$. The duty factor of the chopper is gradually increased from the minimum to a predetermined value which is not necessarily the maximum. When this predetermined duty factor is attained, the chopping frequency is increased to $f/2$ Hz. In this case, the duty factor of the chopper is suitably adjusted so that the value thereof at the chopping frequency of $f/2$ Hz may be reduced to minimize variations of the traction motor current. To this end, the error between the instructed acceleration and the traction motor current (present acceleration) is detected and the pattern voltage applied to the comparator 16 is adjusted depending on the detected error.

The chopping frequency $f/2$ Hz of the chopper operating with the adjusted duty factor is then varied to $f$ Hz. In this case too, the duty factor at the chopping frequency of $f$ Hz is suitably adjusted to minimize variations of the traction motor current. The period of time required for the increase in the chopping frequency from the minimum to the maximum is desirably as short as possible.

This manner of starting is advantageous in that the smallest starting current is about one-third of that of the case in which the motor is started at the chopping frequency of $f$ Hz. Therefore, the starting current can be continuously increased from the initial value which is one-third of that of the case in which the motor is started at the chopping frequency of $f$ Hz. The motor can thus be started smoothly. Further, due to the fact that only a few specific frequencies (that is, $f/3$ Hz, $f/2$ Hz and $f$ Hz in this example) are used for operation, means for preventing these frequencies from inducing noises can be easily provided and the inductive interference can be easily avoided by providing a filter circuit to these frequencies changing stepwise. Furthermore, the gain of the comparator 16 remains the same as that in the maximum chopping frequency of $f$ Hz. Thus, the stability of control can be improved due to the fact that variations of the chopping frequency of the chopper do not change the gain of the comparator 16 and the output frequency of the saw-tooth waveform generator 15 is not also changed.

Figure 10:
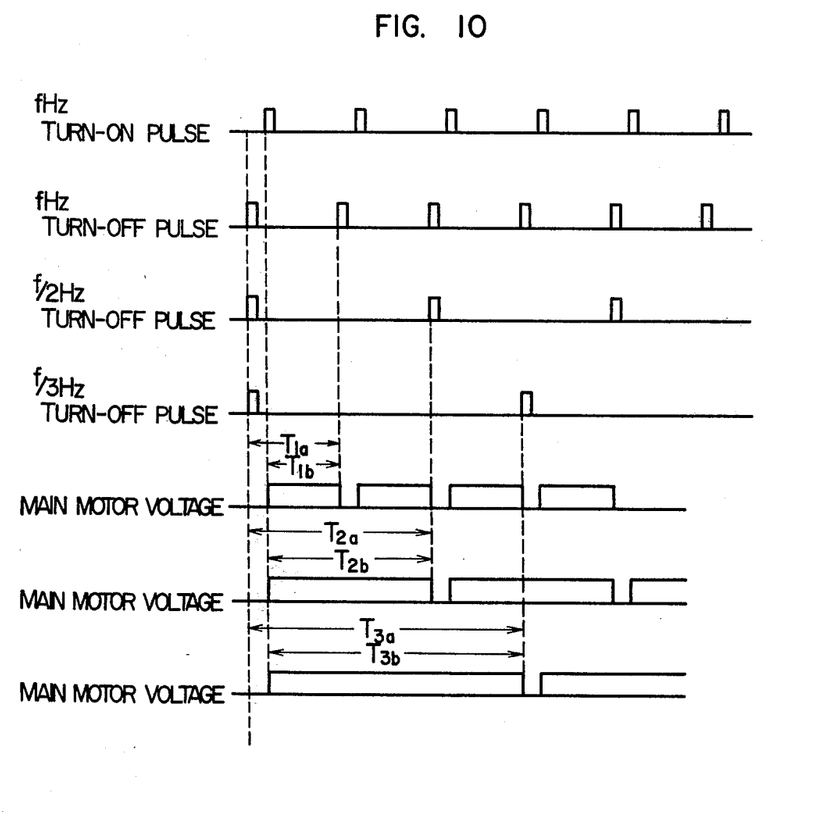
FIG. 10 shows the relation between the turn-off and turn-on pulses generated by the system of FIG. 6 so as to reduce the operating frequency of the chopper in the free running state of the traction motor.

The traction motor is gradually accelerated and the starting operation is completed when the duty factor of the chopper attains its maximum at the chopping frequency of $f$ Hz. Then, the free running state of the traction motor takes place, which has conventionally been performed at the maximum duty factor of the chopper operating at the maximum chopping frequency of $f$ Hz. The utilization factor of the power supply voltage in the free running state can be increased in a manner as for example described below. The $f$ Hz turn-on pulse instruction signal remains to be applied to the AND gate $AND_3$ in FIG. 6, while the $f/2$ Hz turn-off pulse instruction signal instead of the $f$ Hz turn-off pulse instruction signal is applied to the AND gate $AND_5$ by opening the switch $SW_{23}$ in FIG. 7 with closing the switch $SW_{22}$ (in this time the switch $SW_{12}$ is closed). As a result, the frequency of the turn-off pulses applied to the chopper is reduced to $f/2$ Hz, that is, the chopping frequency of the chopper is now $f/2$ Hz. It will be seen from FIG. 10 that the duty factor $T_{2b}/T_{2a}$ at the chopping frequency of $f/2$ Hz is greater than the duty factor $T_{1b}/T_{1a}$ at the chopping frequency of $f$ Hz. Then, when the chopping frequency is reduced to $f/3$ Hz, the duty factor $T_{3b}/T_{3a}$ at this chopping frequency can be further increased. It is to be noted however that the period of time required for commutation is not taken into account in FIG. 10.

It will thus be seen that, in the free running state of the traction motor, the number of the turn-off pulses is decreased to reduce the chopping frequency of the chopper and to increase the duty factor of the chopper. Therefore, the utilization factor of the power supply voltage can be improved, and at the same time, the capacity of the commutating capacitor can be reduced.

The improvement in the duty factor of the chopper will be described on the basis of practical numerical values. The chopping frequencies $f$, $f/2$ and $f/3$ are assumed to be 220 Hz, 110 Hz and 73 Hz respectively. Suppose initially that the traction motor is free running at the maximum duty factor of the chopper of, for example, 95 % at 220 Hz. Then, when the number of the turn-off pulses is decreased to provide the chopping frequencies of 110 Hz and 73 Hz, the maximum duty factors of the chopper at the respective frequencies are $$\frac{95 + 100}{200} = 97.5 \%$$

in the case of 110 Hz, and $$\frac{95 + 100 + 100}{300} = 98.3 \%$$

in the case of 73 Hz.

It is necessary to decrease the traction motor current when the speed of the electric car becomes excessively high or racing occurs in the free running state of the traction motor. In this case, the chopping frequency may be restored to $f$ Hz by suitably controlling the AND gates $AND_4$ to $AND_6$ and the duty factor may be controlled while increasing the response speed. Of course, the duty factor may be suitably adjusted at the chopping frequencies of $f/2$ Hz and $f/3$ Hz when a high response speed is not required.

According to the present invention, changeover from the free running state to the notch-off state can be easily attained without causing any appreciable shock. This is accomplished by restoring the chopping frequency of the chopper to $f$ Hz, reducing the duty factor of the chopper at $f$ Hz to the minimum, changing the chopping frequency to $f/2$ Hz, reducing the duty factor at $f/2$ Hz to the minimum, and then changing the chopping frequency to $f/3$ Hz with the reduction of the traction motor current. Subsequently, the duty factor at the chopping frequency of $f/3$ Hz is reduced to the minimum, and the notch-off state is established by opening the circuit breaker in the traction motor circuit or ceasing application of the gate pulses to the chopper. In this manner, the notchoff state can be established smoothly at a moderate rate of deceleration. Of course, one frequency step may be changed over to another at a suitable duty factor which is not necessarily the minimum.

It will be understood from the foregoing detailed description of the present invention that the chopper operates with a few specific frequencies. Thus, means for preventing noise troubles due to such frequencies can be easily provided and the traction motor can be started smoothly without giving rise to the problem of inductive interference. Further, the utilization factor of the power supply voltage can be improved in the free running state of the traction motor due to the fact that the duty factor of the chopper can be increased by reducing the chopping frequency. Furthermore, the capacity of the commutating capacitor can be reduced by virtue of the reduction in the chopping frequency, and hence, the capacity of the chopper itself can also be reduced.

While the foregoing description has referred to the case in which the chopping frequency is varied over three steps, the number of frequency steps is in no way limited to three. Further, it is apparent that the divided frequencies are not necessarily $1/n$ of the maximum frequency where $n$ is an integer.

What is claimed is:

1. A system for controlling a chopper which conducts in response to the application of a train of turn-on pulses and is rendered non-conducting in response to the application of a train of turn-off pulses, comprising a frequency oscillator for generating a train of pulses determining the maximum chopping frequency of said chopper and providing said turn-off pulses, means for generating said turn-on pulses in synchronism with said turn-off pulses generated by said frequency oscillator in such a relationship that said turn-on pulses alternate with said turn-off pulses, means for generating instruction signals consisting of a plurality of turn-on pulse instruction signals indicating the frequency of the turn-on pulse to be applied to the chopper and a plurality of turn-off pulse instruction signals indicating the frequency of the turn-off pulse to be applied to the chopper, turn-off pulse selecting means for selectively applying the pulses of the turn-off pulse train generated by said frequency oscillator to said chopper depending on the applied turn-off pulse instruction signal, and turn-on pulse selecting means for selectively applying the pulses of the turn-on pulse train generated by said turn-on pulse generating means to said chopper depending on the applied turn-on pulse instruction signal.

2. A chopper control system according to claim 1, wherein said turn-off pulse selecting means comprises a plurality of AND gates to each of which the output of said frequency oscillator is applied as one input and one of the outputs of said instruction signal generating means is applied as the other input, and an OR gate to which the outputs of all said AND gates are applied as the inputs, and said turn-on pulse selecting means comprises a plurality of AND gates to each of which the output of said turn-on pulse generating means is applied as one input and one of the outputs of said instruction signal generating means is applied as the other input, and an OR gate to which the outputs of all said AND gates are applied as the inputs.

3. A chopper control system according to claim 1, wherein said instruction signal generating means comprises a multivibrator receiving the output pulses of said frequency oscillator as two inputs, a first frequency divider connected to said multivibrator for delivering pulses of first frequency, a second frequency divider connected to said multivibrator for delivering pulses of second frequency, a first AND gate connected to said first frequency divider and connected to a power supply through a first switch, a second AND gate connected to said second frequency divider and connected to said power supply through a second switch, a first pair of output terminals, one connected directly to the output of said first AND gate and the other connected to the output of said first AND gate through a switch, a second pair of output terminals, one connected directly to the output of said second AND gate and the other connected to the output of said second AND gate through a switch, and a third pair of output terminals, one connected to said power supply through a third switch and the other connected to said power supply through said third switch and another switch.

4. A chopper control system according to claim 1, wherein the turn-on pulse instruction signal and the turn-off pulse instruction signal indicating the turn-on pulse and the turn-off pulse to be applied to the chopper which have the same frequency are simultaneously generated.

5. A chopper control system according to claim 1, wherein the turn-on pulse instruction signal indicating the turn-on pulse to be applied to the chopper having the maximum frequency and the turn-off pulse instruction signal indicating the turn-off pulse to be applied to the chopper having the frequency other than the maximum frequency are simultaneously generated.

* * * * *